(12) United States Patent
Maruyama et al.

(10) Patent No.: US 10,807,516 B2
(45) Date of Patent: Oct. 20, 2020

(54) LIGHTING CIRCUIT

(71) Applicant: Koito Manufacturing Co., Ltd., Tokyo (JP)

(72) Inventors: Yuta Maruyama, Shizuoka (JP); Kentarou Murakami, Shizuoka (JP); Takao Muramatsu, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 16/296,909

(22) Filed: Mar. 8, 2019

(65) Prior Publication Data

US 2019/0202344 A1 Jul. 4, 2019

Related U.S. Application Data

(63) Continuation of application No. PCT/JP2017/032341, filed on Sep. 7, 2017.

(30) Foreign Application Priority Data

Sep. 9, 2016 (JP) .................................. 2016-176236

(51) Int. Cl.
*B60Q 1/14* (2006.01)
*B60Q 1/04* (2006.01)
*H05B 47/10* (2020.01)

(52) U.S. Cl.
CPC ............. *B60Q 1/1423* (2013.01); *B60Q 1/04* (2013.01); *H05B 47/10* (2020.01); *Y02B 20/42* (2013.01)

(58) Field of Classification Search
None
See application file for complete search history.

(56) References Cited

U.S. PATENT DOCUMENTS 8,164,865 B2* 4/2012 Critchley ............. H01H 47/325
361/2
8,638,043 B2* 1/2014 Chiang .................. H05B 45/48
315/291
(Continued)

FOREIGN PATENT DOCUMENTS

CN 103889108 A 6/2014
CN 105451411 A 3/2016
(Continued)

OTHER PUBLICATIONS

International Search Report (Form PCT/ISA/210) dated Oct. 24, 2017, in corresponding international Application No. PCT/JP2017/032341. (6 pages).
(Continued)

*Primary Examiner* — Amy Cohen Johnson
*Assistant Examiner* — Srinivas Sathiraju
(74) *Attorney, Agent, or Firm* — Buchanan Ingersoll & Rooney PC (57) ABSTRACT

A lighting circuit drives a light source including N (N represents an integer of 2 or more) multiple light-emitting elements coupled in series. A bypass switch circuit includes N multiple bypass switches, each coupled in parallel to a corresponding light-emitting element. A constant current driving circuit supplies a driving current stabilized to a target current to the light source. A light distribution controller controls the bypass switch circuit. For a given light distribution pattern, the duty ratio $D_i(\%)$ is determined for each of the N multiple light-emitting elements. Multiple light-emitting elements are formed as control units having a sum total of duty ratios that is less than 100%. The light distribution controller controls the multiple bypass switches such that the multiple light-emitting elements included in the same control unit are not turned on at the same time.

6 Claims, 10 Drawing Sheets

(56) References Cited

U.S. PATENT DOCUMENTS

| | | | | |
|---|---|---|---|---|
| 8,638,047 B2* | 1/2014 | Chiang | ................ | H02M 7/06 315/291 |
| 8,664,869 B2* | 3/2014 | Grebner | ................ | H05B 45/48 315/186 |
| 9,113,524 B2* | 8/2015 | Kurt | ................ | H05B 45/48 |
| 9,386,646 B2* | 7/2016 | Ito | ................ | H05B 45/37 |
| 9,494,288 B2* | 11/2016 | Kobayashi | ................ | B60Q 1/1423 |
| 9,502,198 B2* | 11/2016 | Parga-Cacheiro | ................ | B60T 15/00 |
| 9,550,448 B2* | 1/2017 | Tanaka | ................ | F21S 41/143 |
| 9,648,679 B2* | 5/2017 | Murakami | ................ | F21S 41/336 |
| 9,713,979 B2* | 7/2017 | Imaeda | ................ | B60Q 1/12 |
| 9,840,186 B2* | 12/2017 | Ichikawa | ................ | H05B 45/10 |
| 9,867,243 B2* | 1/2018 | Grajcar | ................ | H05B 45/50 |
| 10,000,150 B2* | 6/2018 | Muramatsu | ................ | B60Q 1/1423 |
| 10,383,193 B2* | 8/2019 | Ichikawa | ................ | B60Q 1/04 |
| 2008/0116818 A1* | 5/2008 | Shteynberg | ................ | H05B 45/22 315/192 |
| 2011/0199011 A1* | 8/2011 | Nakazawa | ................ | G09G 3/342 315/193 |
| 2011/0221352 A1* | 9/2011 | Grebner | ................ | H05B 45/48 315/186 |
| 2013/0207571 A1* | 8/2013 | Esaki | ................ | H05B 45/327 315/297 |
| 2014/0055046 A1* | 2/2014 | Shteynberg | ................ | H05B 45/38 315/186 |
| 2014/0145611 A1* | 5/2014 | Baudru | ................ | B60Q 3/82 315/77 |
| 2015/0124003 A1* | 5/2015 | Mio | ................ | G09G 3/3406 345/690 |
| 2015/0264754 A1 | 9/2015 | Ito et al. | | |
| 2016/0081171 A1* | 3/2016 | Ichikawa | ................ | B60Q 11/005 315/77 |
| 2016/0309553 A1 | 10/2016 | Kuerschner et al. | | |
| 2017/0034887 A1* | 2/2017 | Ichikawa | ................ | B60Q 1/04 |
| 2017/0171952 A1* | 6/2017 | Troutman | ................ | B60Q 11/005 |
| 2018/0056853 A1* | 3/2018 | Muramatsu | ................ | B60Q 1/1423 |
| 2018/0178710 A1* | 6/2018 | Ichikawa | ................ | H02M 3/155 |
| 2019/0016249 A1* | 1/2019 | Ichikawa | ................ | H02M 3/156 |
| 2019/0202344 A1* | 7/2019 | Maruyama | ................ | B60Q 1/04 |
| 2020/0008276 A1* | 1/2020 | Safaee | ................ | H05B 45/48 |

FOREIGN PATENT DOCUMENTS

| | | | | |
|---|---|---|---|---|
| DE | 10 2008 060 042 A1 | 9/2009 | | |
| JP | 2009-134933 A | 6/2009 | | |
| JP | 2015-153657 A | 8/2015 | | |
| JP | 2015-174549 A | 10/2015 | | |
| WO | 2006/107199 A2 | 10/2006 | | |
| WO | 2007/093938 A1 | 8/2007 | | |
| WO | WO-2007093938 A1 * | 8/2007 | ......... | H05B 33/0815 |
| WO | WO-2009134933 A1 * | 11/2009 | ........... | H01H 47/325 |
| WO | 2015/074891 A1 | 5/2015 | | |

OTHER PUBLICATIONS

International Preliminary Report on Patentability (Form PCT/IB/373) and the Written Opinion of the International Searching Authority (Form PCT/ISA/237) dated Mar. 12, 2019, in corresponding international Application No. PCT/JP2017/032341. (11 pages).

First Office Action dated Dec. 2, 2019 in corresponding Chinese Patent Application No. 201780054767.4 with English Translation, 14 pages.

Extended European Search Report dated Feb. 25, 2020, issued by the European Patent Office in corresponding European Application No. 17848853.2. (10 pages).

Office Action dated Jun. 29, 2020, by the Chinese Patent Office in corresponding Chinese Patent Application No. 201780054767.4 and English translation of the Office Action. (17 pages).

* cited by examiner

NORMAL HIGH-BEAM MODE

FIG. 8B

RIGHT-SIDE SWIVEL MODE
(WHEN VEHICLE IS TRAVELING ALONG RIGHT-SIDE CURVE)

FIG. 8C

BAD WEATHER MODE

FIG. 9A

NORMAL HIGH-BEAM MODE

LIGHTING CIRCUIT

BACKGROUND OF THE INVENTION

1. Field of the Invention

The present invention relates to a lighting device to be used in a vehicle or the like.

2. Description of the Related Art

Typical automotive lamps are capable of switching between a low-beam mode and a high-beam mode. The low-beam mode is used to illuminate a close range with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or otherwise a driver of a vehicle ahead of the vehicle.

In recent years, the ADB (Adaptive Driving Beam) control technique has been proposed in which a high-beam distribution pattern is dynamically and adaptively controlled based on the state of the surroundings of a vehicle. With the ADB control technique, the presence or absence of a leading vehicle, an oncoming vehicle, or a pedestrian ahead of the vehicle is detected, and the illumination is reduced for a region that corresponds to such a vehicle or pedestrian thus detected, thereby reducing glare imparted to such a vehicle or pedestrian. Also, this technique allows the front side in the traveling direction to be illuminated with high light intensity when the vehicle turns left or right.

Figure 1:
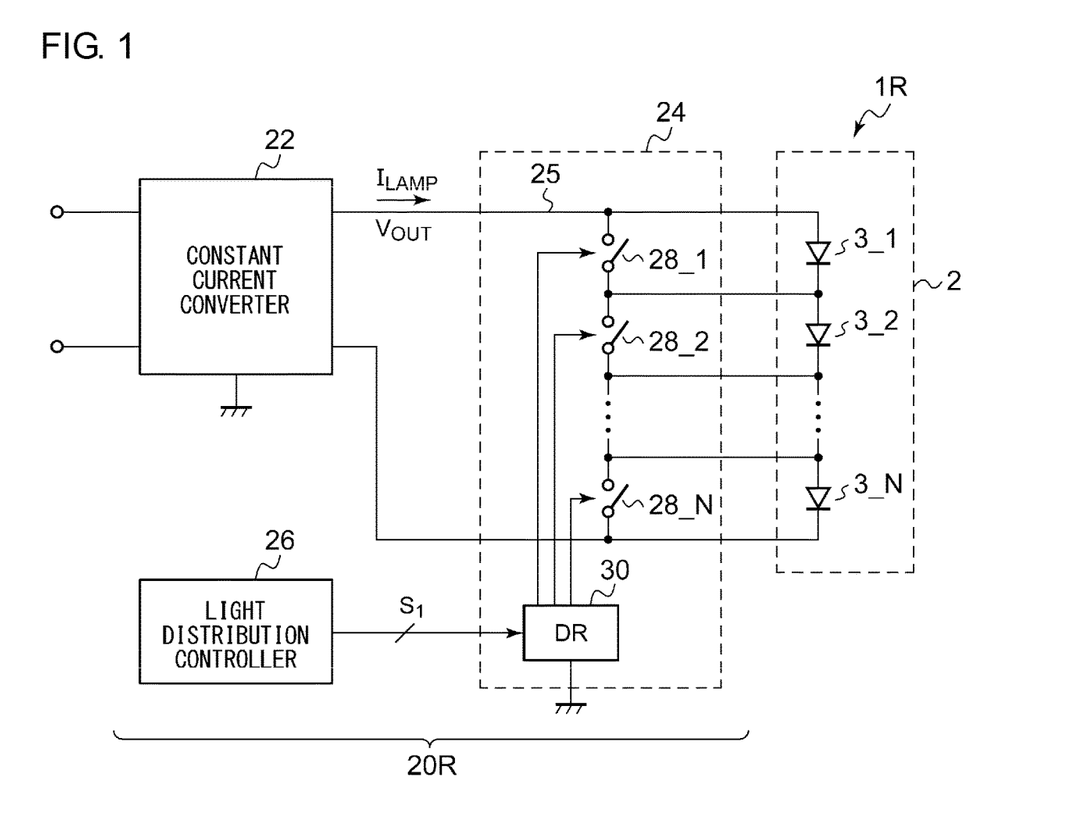
FIG. 1 is a block diagram showing an automotive lamp having an ADB function according to a comparison technique.

Description will be made regarding an automotive lamp having an ADB function. FIG. 1 is a block diagram showing an automotive lamp having an ADB function according to a comparison technique. It should be noted that this comparison technique is by no means to be regarded as a known technique.

An automotive lamp 1R includes a light source 2 and a lighting circuit 20R. In order to support the ADB control operation, the high-beam illumination region is formed of N (N represents an integer of 2 or more) multiple divided sub regions. The light source 2 includes multiple light-emitting elements 3_1 through 3_N associated with the N sub regions. Each light-emitting element 3 is configured as a semiconductor device such as an LED (light-emitting diode), LD (laser diode), or the like.

The lighting circuit 20R receives a power supply voltage $V_{BAT}$ from a battery 4, and controls the on state (lighting-on state) and the off state (lighting-off state) of each of the multiple light-emitting elements 3_1 through 3_N, so as to change the high-beam light distribution. Alternatively, the lighting circuit 20R PWM (pulse-width modulation) controls a current $I_{LAMP}$ that flows through the light-emitting elements 3 with a high frequency, so as to adjust the effective luminance.

The lighting circuit 20R includes a constant current converter 22, a bypass switch circuit 24, and a light distribution controller 26. The constant current converter 22 generates an output current $I_{LAMP}$ stabilized to a target value $I_{REF}$, and supplies the output current $I_{LAMP}$ to the light source 2.

The bypass switch circuit 24 includes a driving circuit 30 and multiple bypass switches 28_1 through 28_N that correspond to the multiple light-emitting elements 3_1 through 3_N, respectively. Each bypass switch 28_i is coupled in parallel to the corresponding light-emitting element 3_i. When a given bypass switch 28_i is turned off, the driving current $I_{LAMP}$ flows through the light-emitting element 3_i, which sets the light-emitting element 3_i to the lighting-on state. Conversely, when a given bypass switch 28_i is turned on, the driving current $I_{LAMP}$ flows through the bypass switch 28_i, which sets the light-emitting element 3_i to the lighting-off state.

The light distribution controller 26 generates control signals $CNT_1$ through $CNT_{28}$ that respectively instruct the multiple bypass switches 28_1 through 28_N to turn on and off. The driving circuit 30 drives the bypass switch 28_i based on the control signal $CNT_i$. The light distribution controller 26 PWM controls each of the multiple bypass switches 28_1 through 28_N so as to support PWM dimming of the multiple light-emitting elements 3_1 through 3_N.

When the driving current $I_{LAMP}$ flows through each of k (0≤k≤N) light-emitting elements from among the multiple light-emitting elements 3_1 through 3_N, the voltage across both ends of the light source 2, i.e., the output voltage $V_{OUT}$ of the constant current converter 22, is k×$V_F$. For ease of understanding, description will be made assuming that the forward voltage $V_F$ of each light-emitting element 3 is uniform. Accordingly, the output voltage $V_{OUT}$ of the constant current converter 22 changes with time depending on a combination of the on states and the off states of the multiple bypass switches 28_1 through 28_N.

Typically, the forward voltage $V_F$ of each light-emitting element 3 is on the order of 4 V. Accordingly, in a case in which the light source 2 includes N=12 light-emitting elements 3, the maximum output voltage $V_{OUT}$ of the constant current converter 22 is 12×4=48 V. This means that the maximum voltage applied to an upper-side line 25 of the bypass switch circuit 24 is 48 V. In order to allow the driving circuit 30 to receive the control signals $CNT_1$ through $CNT_N$ with the ground voltage as a reference voltage, the bypass switch circuit 24 includes a ground pin. Accordingly, the bypass switch circuit 24 is required to support a breakdown voltage that is higher than the maximum voltage to be applied to the line 25. As an example, in a case in which $V_{OUT(MAX)}$=48 V, the bypass switch circuit 24 is configured as a 60-V breakdown IC (Integrated Circuit).

In recent years, progress is being made in the ADB control operation with high resolution. In many cases, the number N of the light-emitting elements 3 (number of channels) becomes larger. For example, in a case in which the automotive lamp 1R with N=24 is configured as such an architecture shown in FIG. 1, the maximum voltage $V_{OUT(MAX)}$ is 4×24=96 V. This requires the bypass switch circuit 24 to support a breakdown voltage of 100 V or more. However, such a high-breakdown-voltage IC that supports a high breakdown voltage of 100 V or more leads to a problem of high costs. Furthermore, the constant current converter 22 is required to be designed to support a high breakdown voltage of $V_{OUT(MAX)}$=96 V, leading to a problem of high costs. In particular, with the lighting circuit 20R shown in FIG. 1, the PWM dimming operation involves a dynamic change of the output voltage $V_{OUT}$ of the constant current converter 22 in a range of 0 to 96 V. It is difficult to design such a switching converter that is capable of operating with high stability over such a wide output voltage range.

Figure 2:
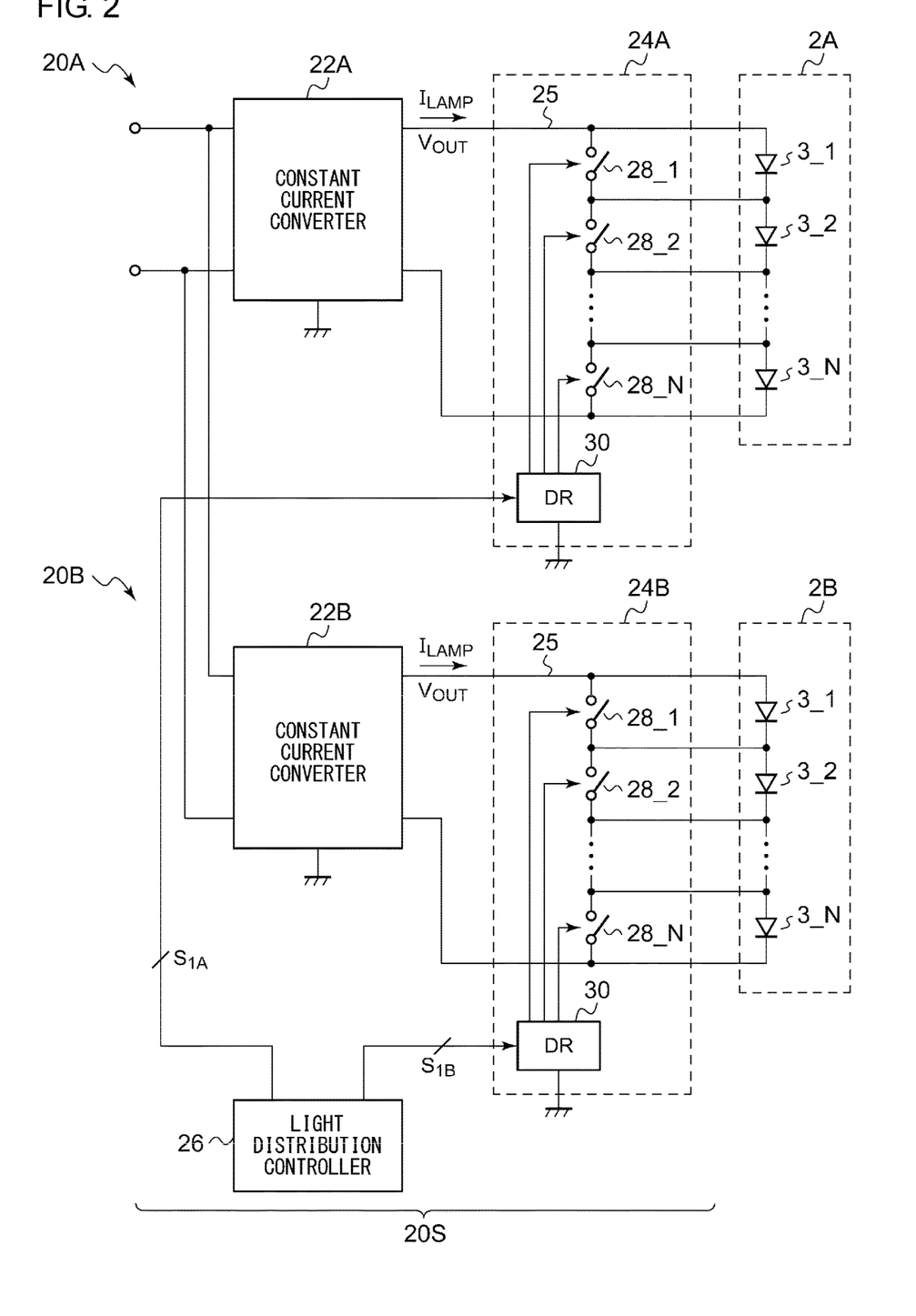
FIG. 2 is a block diagram showing a lighting circuit that is capable of turning on a light source having a large number of channels.

FIG. 2 is a block diagram showing a lighting circuit 20S that is capable of turning on a light source having a large number of channels. The lighting circuit 20S is configured as a dual system including system components A and B coupled in parallel, each of which correspond to the lighting circuit 20R shown in FIG. 1. This arrangement is capable of supporting a large number N of channels using the same breakdown circuit as shown in FIG. 1. However, the lighting circuit 20S shown in FIG. 2 requires two constant current converters 22, leading to a problem of high costs.

SUMMARY OF THE INVENTION

The present invention has been made in order to solve such a problem. Accordingly, it is an exemplary purpose of an embodiment of the present invention to provide such a lighting circuit with low costs.

An embodiment of the present invention relates to a lighting circuit structured to drive a light source comprising N (N represents an integer of 2 or more) multiple light-emitting elements coupled in series. The lighting circuit comprises: a bypass switch circuit comprising N multiple bypass switches each of which is coupled in parallel to a corresponding one from among the multiple light-emitting elements; a constant current driving circuit structured to supply a driving current stabilized to a target current to the light source; and a light distribution controller structured to control the bypass switch circuit. When a duty ratio is determined for each of the N multiple light-emitting elements for a given light distribution pattern, multiple light-emitting elements are formed as a control unit such that the sum total of the duty ratios thereof is equal to or otherwise smaller than 100%. The light distribution controller is structured to switch on and off the multiple bypass switches such that the multiple light-emitting elements included in the same control unit do not turn on at the same time.

With this embodiment, the light-emitting elements of the same control unit are not turned on at the same time. Accordingly, the sum total of the voltage drops of the multiple light-emitting elements of the same control unit is smaller than the voltage drop involved in all the light-emitting elements included in the corresponding array. This arrangement allows the voltage across both ends of the overall light source to be reduced, thereby allowing the required breakdown voltage supported by the bypass switch circuit or the like to be reduced. Furthermore, this arrangement allows the output voltage range of the constant current driving circuit to be reduced, thereby allowing the costs of the lighting circuit to be reduced.

Also, multiple bypass switches that correspond to the multiple light-emitting elements included in the same control unit may be formed as a control unit. Also, the light distribution controller may control the multiple bypass switches included in the same control unit in a shifting manner such that off periods of the multiple bypass switches included in the same control unit do not overlap.

Also, each control unit may include two light-emitting elements.

Also, the control unit may be formed such that the sum total of duty ratios thereof is made to be uniform. This provides heat generation that is made to be uniform.

Also, the multiple light-emitting elements may be classified into a first group, a second group, and a third group in a descending order of the duty ratio. Also, a light-emitting element that belongs to the first group may be paired with a light-emitting element that belongs to the third group. Also, two light-emitting elements that belong to the second group may be paired.

The light-emitting element to be operated with the i-th largest duty ratio from among the first group may be paired with the light-emitting element to be operated with the i-th smallest duty ratio from among the third group. Also, the light-emitting element to be operated with the i-th largest duty ratio from among the second group may be paired with the light-emitting element to be operated with the i-th smallest duty ratio from among the second group.

Also, the multiple light-emitting elements may be arranged in a horizontal direction, and may be classified into a first group, a second group, a third group, and a fourth group, such that they are sequentially arranged from a given end. Also, a light-emitting element included in the first group may be paired with a light-emitting element included in the third group. Also, a light-emitting element included in the second group may be paired with a light-emitting element included in the fourth group. Also, two bypass switches that correspond to each pair of the light-emitting elements may be formed as a pair.

Also, the multiple light-emitting elements may be arranged in the form of a pair of an upper array and a lower array each extending in a horizontal direction. Also, multiple light-emitting elements positioned in a central region of the lower array may be classified as a first group. Also, multiple light-emitting elements positioned on both sides of the lower array may be classified as a second group. Also, the multiple light-emitting elements positioned in the upper array may be classified as a third group. Also, a light-emitting element included in the first group may be paired with a light-emitting element included in the third group. Also, a light-emitting element included in the second group may be paired with a light-emitting element included in the second group. Also, two bypass switches that correspond to the pair of the light-emitting elements may be formed as a pair.

Also, the bypass switch circuit may be configured as an integrated circuit. Also, with the forward voltage of each of the light-emitting elements as $V_F$, and with the number of the multiple light-emitting elements as N, the bypass switch circuit may be configured to support a breakdown voltage that is lower than $(V_F \times N)$.

Also, the light distribution pattern may be switchable and selectable from among multiple light distribution patterns. Also, with the maximum duty ratio (%) of the i-th ($1 \leq i \leq N$) light-emitting elements from among all the light distribution patterns as $D_{MAXi}$, two light-emitting elements may be formed as a control unit such that the sum total of the maximum duty ratios thereof is equal to or smaller than 100%.

Also, the light distribution pattern may be switchable and selectable from among multiple light distribution patterns. Also, multiple light-emitting elements that form each of the control units may be recombined for each light distribution pattern.

Another embodiment of the present invention relates to an automotive lamp. The automotive lamp comprises: a light source comprising multiple light-emitting elements coupled in series; and the lighting circuit structured to drive the light source.

It should be noted that any combination of the components described above, any component of the present invention, or any manifestation thereof, may be mutually substituted between a method, apparatus, system, and so forth, which are also effective as an embodiment of the present invention.

DETAILED DESCRIPTION OF THE INVENTION

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis or ease of understanding.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 3:
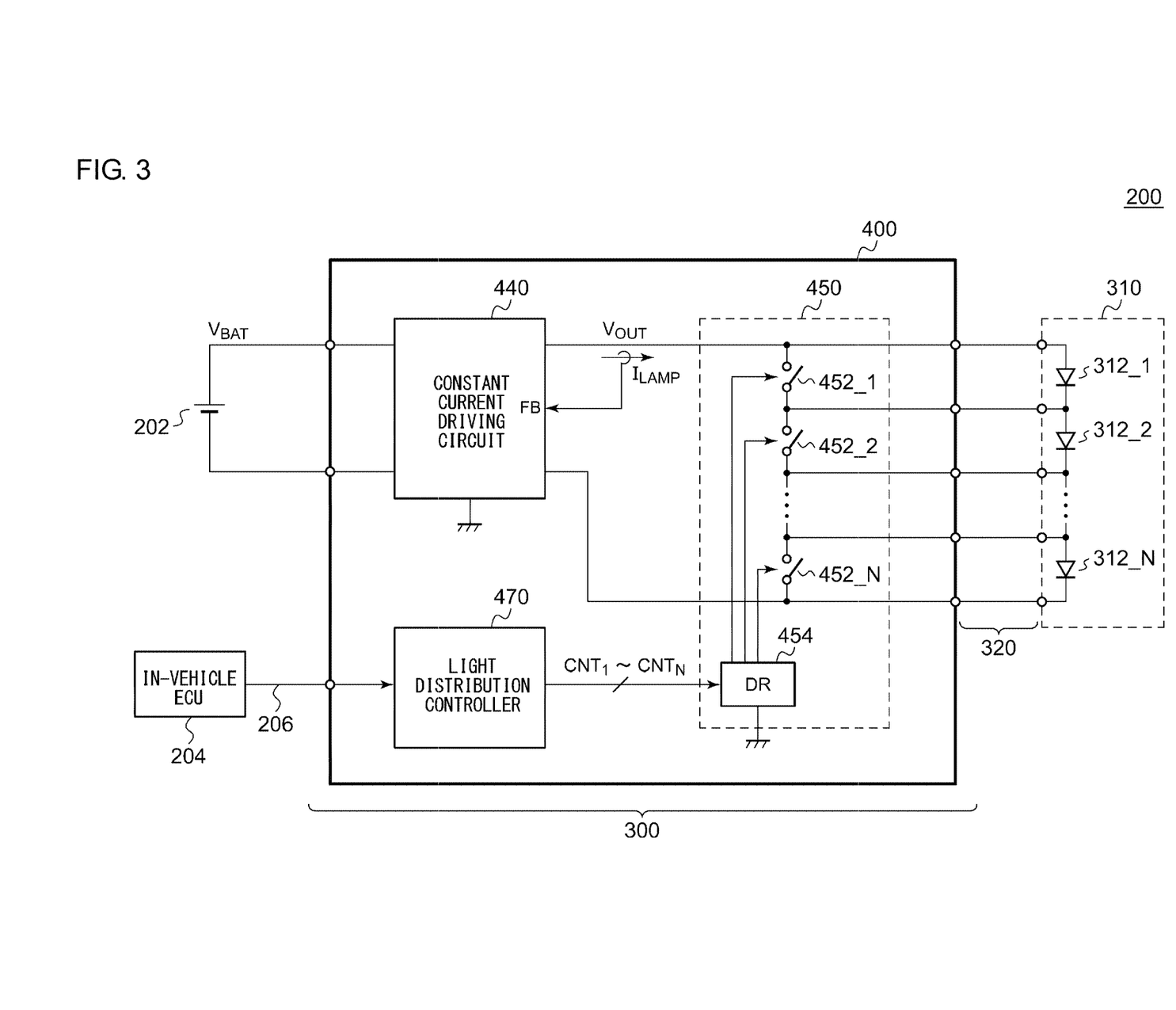
FIG. 3 is a block diagram showing an automotive lamp including a lighting circuit according to an embodiment.

FIG. 3 is a block diagram showing an automotive lamp 300 including a lighting circuit 400 according to an embodiment. The automotive lamp 300 forms a lighting device system 200 together with a battery 202 and an in-vehicle ECU (Electronic Control Unit) 204. The battery 202 generates a battery voltage (power supply voltage) $V_{BAT}$ of 12 V or 24 V. The lighting circuit 400 receives the battery voltage $V_{BAT}$ as a power supply voltage, and turns on a light source 310. The lighting circuit 400 and the in-vehicle ECU 204 are coupled with each other via a bus 206 such as a CAN (Controller Area Network) or LIN (Local Interconnect Network). The automotive lamp 300 has an ADB function, and dynamically adjusts the light distribution pattern based on information or otherwise an instruction value received from the in-vehicle ECU 204.

The automotive lamp 300 includes the light source 310 and the lighting circuit 400. The light source 310 includes multiple (N) channels of light-emitting elements 312_1 through 312_N coupled in series. Each light-emitting element 312 is configured as an LED (light-emitting diode) that emits light according to a driving current $I_{LAMP}$. It should be noted that each light-emitting element is not restricted to such an LED. Also, as such a light-emitting element, an LD (laser diode), organic EL (Electro-Luminescence), or the like, may be employed. The number N of the light-emitting elements 312 corresponds to the resolution of the light distribution pattern control operation. Examples of the number N include 8, 12, 24, 26, 36, and the like. However, the present invention is not restricted to such examples. For simplicity of description, description will be made in the present embodiment regarding an example in which N=24.

The lighting circuit 400 is coupled to the light source 310 via a wire harness 320. The lighting circuit 400 includes a constant current driving circuit 440, a bypass switch circuit 450, and a light distribution controller 470.

The constant current driving circuit 440 receives the power supply voltage $V_{BAT}$ from the battery 202, and generates the driving current $I_{LAMP}$ stabilized to the target current $I_{REF}$. The constant current driving circuit 440 may be configured as a combination of a step-up converter that steps up the power supply voltage $V_{BAT}$ to a predetermined stabilized voltage level (e.g., 60 V) and a step-down converter that receives the output voltage of the step-up converter so as to generate the driving current $I_{LAMP}$.

The bypass switch circuit 450 includes multiple bypass switches 452_1 through 452_N and a driving circuit 454. The i-th bypass switch 452_i is coupled in parallel to the corresponding one from among the multiple light-emitting elements, i.e., to the light-emitting element 312_i. The driving circuit 454 drives the multiple bypass switches 452_1 through 452_N according to the control signals $CNT_1$ through $CNT_N$ received from the light distribution controller 470. For example, with the driving circuit 454, when the i-th control signal $CNT_i$ is set to the high level, the corresponding driving circuit 454_i is turned on. Conversely, when the i-th control signal $CNT_i$ is set to the low level, the corresponding driving circuit 454_i is turned off.

The light distribution controller 470 generates the control signals $CNT_1$ through $CNT_N$ so as to provide a desired light distribution pattern based on the information or control instruction received from the in-vehicle ECU 204.

The above is the basic configuration of the lighting circuit 400. Next, description will be made regarding a characteristic control operation of the light distribution controller 470 for the bypass switch circuit 450.

When a given light distribution pattern is set, with the duty ratio (%) of the i-th (1≤i≤N) light-emitting element 312_i as $D_i$, multiple light-emitting elements 312 are selected such that the sum total of their duty ratios $D_i$ is equal to or smaller than 100%, which are employed as a control unit.

$$D_i = T_{ONi}/T_{PWM}$$

Here, $T_{ONi}$ represents the on period of the corresponding light-emitting element 312_i, and $T_{PWM}$ represents the PWM period.

A single control unit may include two, three, four, or more light-emitting elements 312. Description will be made in the present embodiment regarding an example in which a single control unit is configured as a pair of light-emitting elements 312. Accordingly, in the following description, a control unit will be referred to as a "control pair" hereafter.

For example, when a given light distribution pattern is set, a pair of light-emitting elements with duty ratios of 20% and 70% can form a control pair (because 20%+70%≤100%). Also, a pair of light-emitting elements with duty ratios of 50% and 40% can form a control pair (because 50%+40%≤100%).

The light distribution controller 470 switches on and off the multiple bypass switches 452 that correspond to the multiple light-emitting elements 312 included in the same control unit such that they do not turn on at the same time. That is to say, the control units of the bypass switches 452 are respectively formed corresponding to the control units of the light-emitting elements 312. Each control unit includes multiple bypass switches 452 such that the sum total of the off-time duty ratios D thereof is equal to or smaller than 100%. The multiple bypass switches 452 included in a single control unit are controlled such that they do not turn off at the same time.

All the N (=24) light-emitting elements (and accordingly, all the bypass switches) are preferably grouped so as to form the control pairs. In this case, the number of the control pairs thus formed is N/2 (=12).

The above is the configuration of the lighting circuit 400. Next, description will be made regarding the operation thereof.

Figure 4:
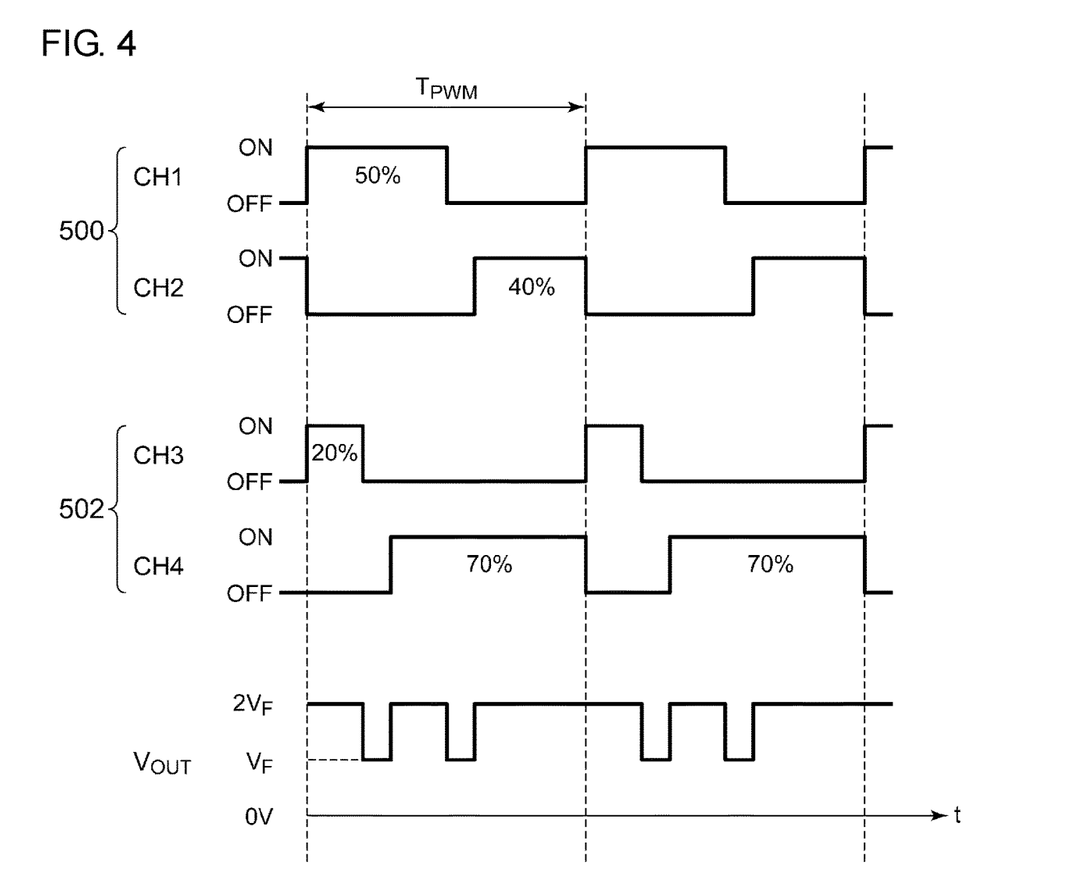
FIG. 4 is a diagram for explaining a switching operation of a control pair.

FIG. 4 is a diagram for explaining the operation of the switching operation of a control pair. For simplicity of description, description will be made regarding an example in which the number of channels N=4. In the waveforms CH1 through CH4, the high-level period represents the lighting-on period, and the low-level period represents the lighting-off period. A bypass switch assigned to each channel is turned off in the lighting-on period, and is turned on in the lighting-off period.

Description will be made assuming that a pair of channels CH1 and CH2 to be respectively operated with lighting-on duty ratios of 50% and 40% are formed as a first pair 500, and another pair of channels CH3 and CH4 to be respectively operated with lighting-on duty ratios of 20% and 70% are formed as a second pair 502. Directing attention to the first pair 500, in the first period of the PWM period $T_{PWM}$, the channel CH1 is turned on. After the channel CH1 is turned off, the light distribution controller 470 turns on the channel CH2.

Similarly, directing attention to the second pair 502, in the first period of the PWM period $T_{PWM}$, the channel CH3 is turned on. After the channel CH3 is turned off, the light distribution controller 470 turns on the channel CH4.

FIG. 4 shows the voltage that occurs across both ends of the four channels of light-emitting elements, i.e., the output voltage $V_{OUT}$ of the constant current driving circuit 440. In this example, in the PWM period, one or two bypass switches are turned off, which sets one or two light-emitting elements to the lighting-on state. Accordingly, the output voltage $V_{OUT}$ changes between two values, i.e., between $(2 \times V_F)$ and $V_F$.

Figure 5:
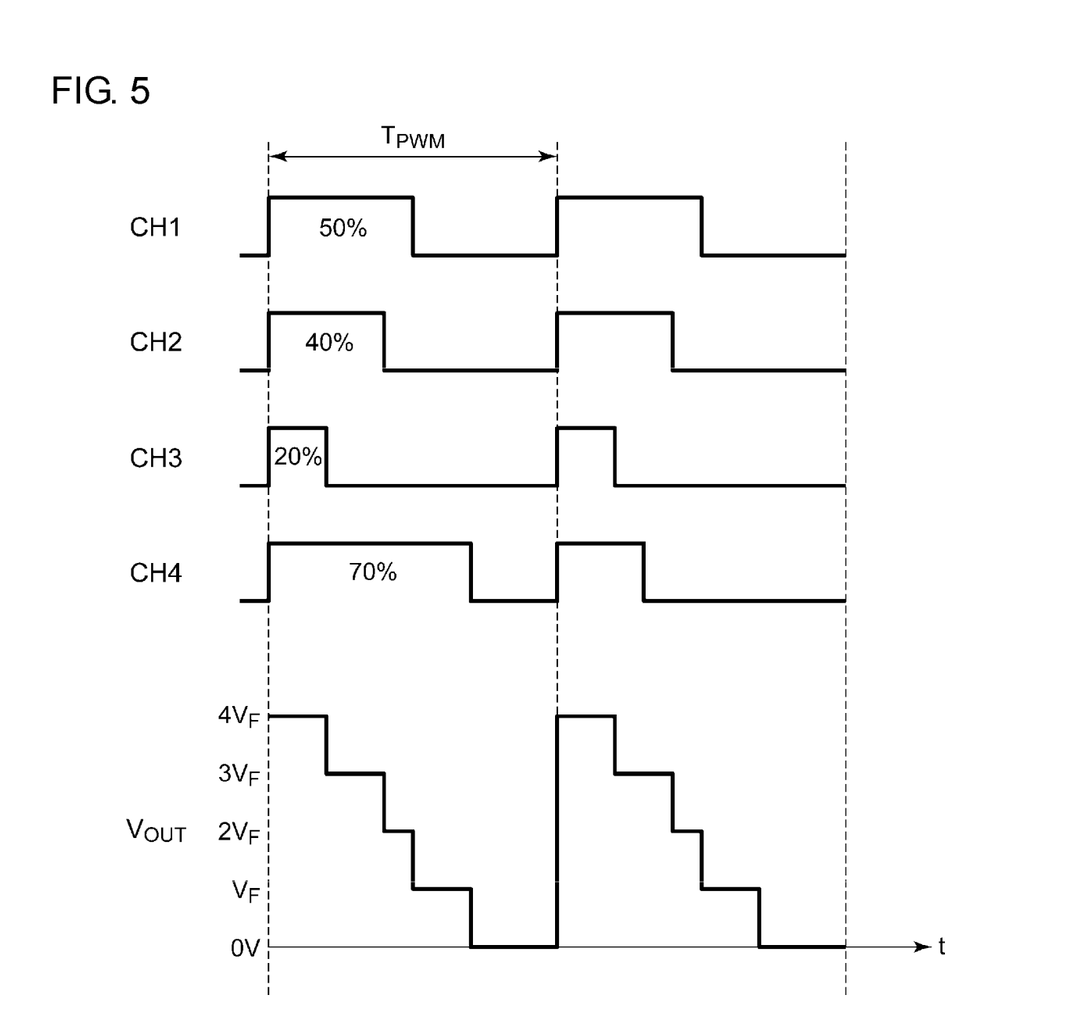
FIG. 5 is a waveform diagram showing the operation when four bypass switches are controlled independently without pairing.

The above is the configuration of the lighting circuit 400. Next, description will be made regarding the advantage thereof. This advantage can be clearly understood in comparison with an arrangement shown in FIG. 5. FIG. 5 is a waveform diagram showing an operation in which the four bypass switches are independently controlled without pairing of the four bypass switches. In this control operation, there is a period in which the four channels of light-emitting elements are turned on at the same time. Accordingly, the maximum output voltage $V_{OUT}$ is $(4 \times V_F)$.

Description will be made in comparison between the operations shown in FIGS. 5 and 4. With the control operation shown in FIG. 4, two channels of the light-emitting elements associated with the same control pair are not turned on at the same time. Accordingly, each control pair involves a voltage drop of $V_F$ or otherwise zero. Accordingly, in a case in which the number of control pairs is K, this arrangement allows the maximum value of the voltage across both ends of the light source 310, i.e., the maximum value $V_{OUT(MAX)}$ of the output voltage $V_{OUT}$ of the constant current driving circuit 440, to be reduced to $(K \times V_F)$.

In a case in which all the N=24 light-emitting elements 312 (bypass switches 452) are subjected to such pairing, this arrangement provides K=12 control pairs. In this case, the maximum value $V_{OUT(MAX)}$ of the output voltage $V_{OUT}$ is $(12 \times 4)=48$ V. This value is half the maximum value $V_{OUT(MAX)}$ of the output voltage $V_{OUT}$ involved in a case in which the 24 light-emitting elements are turned on using a conventional technique, which is $(24 \times 4)=96$ V. This arrangement does not require a dual system configured as a pair of converters as shown in FIG. 2. This allows the costs to be reduced, and allows the circuit area to be reduced.

In a case in which the bypass switch circuit 450 is integrated, a breakdown voltage of 60 V is sufficient for the bypass switch circuit 450. This allows the breakdown voltage of the bypass switch circuit 450 to be lower than $(V_F \times N)$.

Next, description will be made regarding a method for the formation of each control pair.

The multiple bypass switches 452 are classified into a first group, a second group, and a third group in descending order of the duty ratio D. Subsequently, a bypass switch that belongs to the first group and another bypass switch that belongs to the third group are paired. Furthermore, two bypass switches that belong to the second group are paired.

Such a pair is preferably formed so as to make the sum total of the duty ratios uniform over the multiple control units. Accordingly, the bypass switch to be operated with the i-th largest duty ratio from among the first group may be paired with the bypass switch to be operated with the i-th smallest duty ratio from among the third group. Also, the bypass switch to be operated with the i-th largest duty ratio from among the second group and the bypass switch to be operated with the i-th smallest duty ratio from among the second group may be paired.

Figure 6:
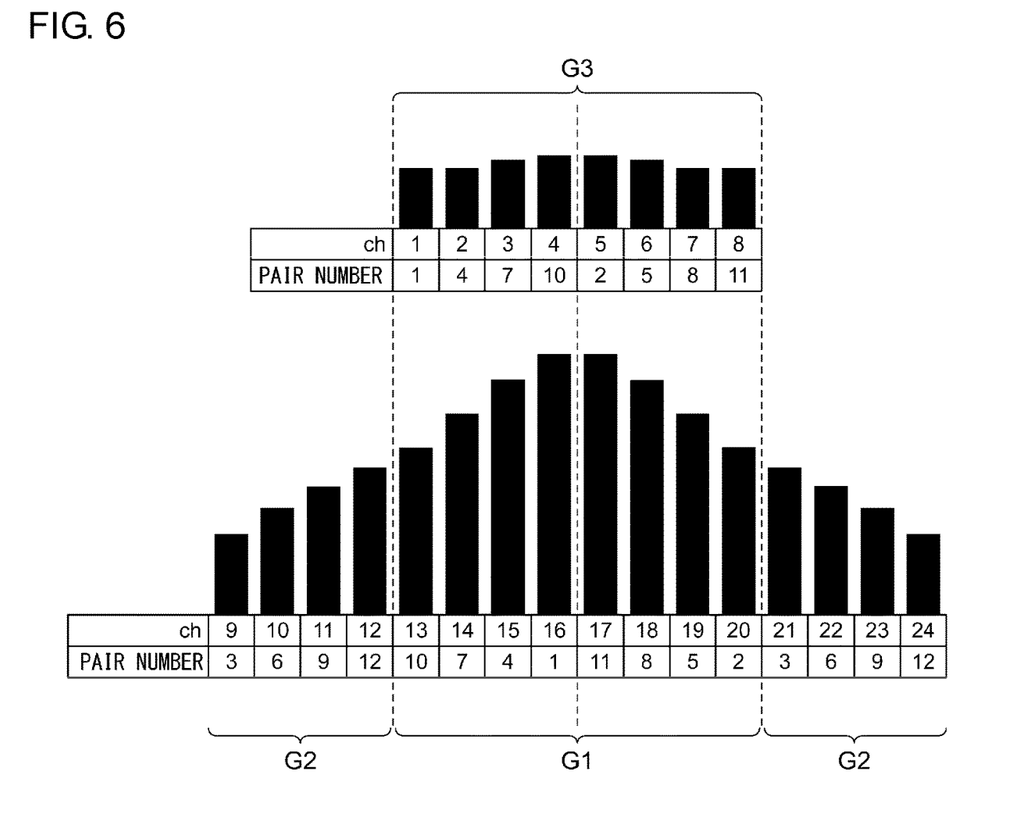
FIG. 6 is a diagram showing an example of pairing of multiple light-emitting elements.

FIG. 6 is a diagram for explaining an example of the pairing of multiple light-emitting elements. In FIG. 6, the duty ratios of the PWM driving operation of the multiple light-emitting elements are shown as a bar graph. The multiple (N=24) light-emitting elements are arranged so as to form two arrays, i.e., an upper array and a lower array, each of which extends in the horizontal direction. The eight light-emitting elements in the upper array are arranged such that they emit light toward an upper region. The sixteen light-emitting elements in the lower array are arranged such that they emit light toward a lower region. The channel numbers CH 1 through 8 are assigned to the light-emitting elements in the upper array. The channel numbers CH 9 through 24 are assigned to the light-emitting elements in the lower array. It should be noted that there may be no relation between the channel number CH and the number of the light-emitting element 312. From another viewpoint, there may be no relation between the physical position of the light-emitting element and the electrical position thereof.

The multiple light-emitting elements (CH=13 through 20) positioned in a central region of the lower array are classified into a first group G1. The multiple light-emitting elements (CH=9 through 12, and 21 through 24) positioned on both sides of the lower array are classified into a second group G2. Furthermore, the multiple light-emitting elements (CH=1 through 8) of the upper array are classified into a third group G3.

A light-emitting element included in the first group G1 is paired with another light-emitting element included in the third group G3. Furthermore, a light-emitting element included in the second group G2 is paired with another light-emitting element included in the second group G2.

More specifically, the light-emitting element to be operated with the i-th largest duty ratio from among the first group G1 is paired with the light-emitting element to be operated with the i-th smallest duty ratio from among the third group. Furthermore, the light-emitting element to be operated with the i-th largest duty ratio from among the second group is paired with the light-emitting element to be operated with the i-th smallest duty ratio from among the second group.

Figure 7:
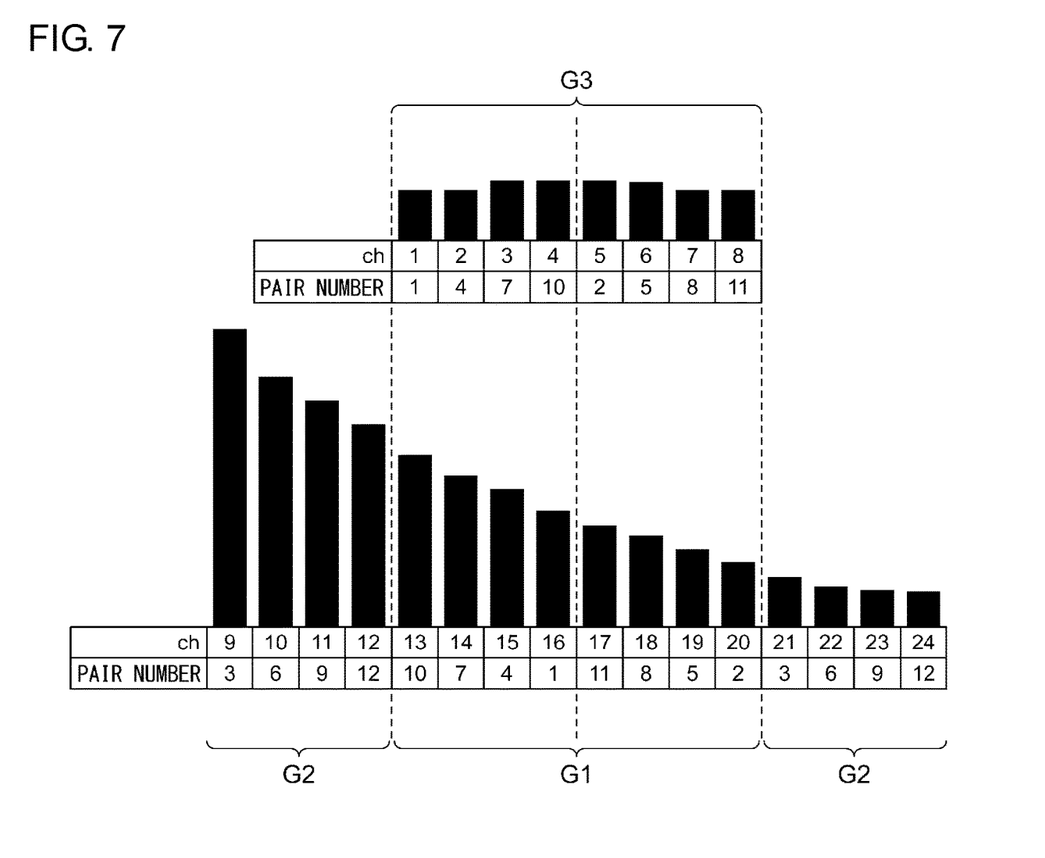
FIG. 7 is a diagram showing duty ratios when another light distribution pattern is employed.

FIG. 7 is a diagram showing each duty ratio when another light distribution pattern is set. The light distribution pattern shown in FIG. 7 corresponds to an electronic swivel function for illuminating the left side ahead of the vehicle with high light intensity when it is traveling along a left-side curve. By forming the pairs as shown in FIG. 6, this arrangement is not required to change the pairs even in a case of switching the light distribution pattern as shown in FIG. 7. It should be noted that the pairs may be changed for each light distribution pattern.

Figure 8A:
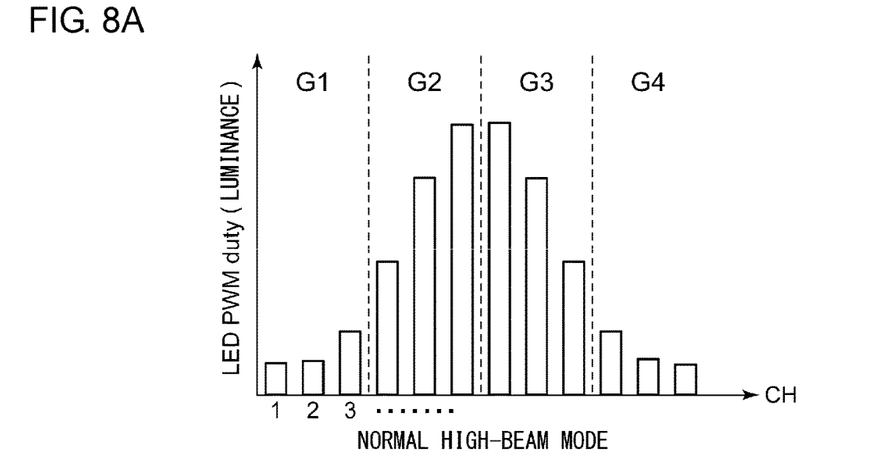
FIGS. 8A through 8C are diagrams for explaining an example of pairing of the multiple light-emitting elements.
Figure 8B:
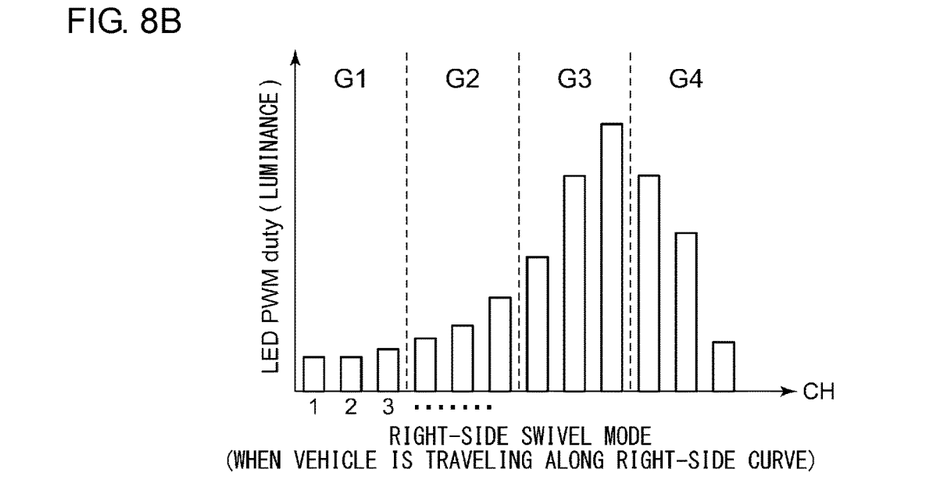
Figure 8C:
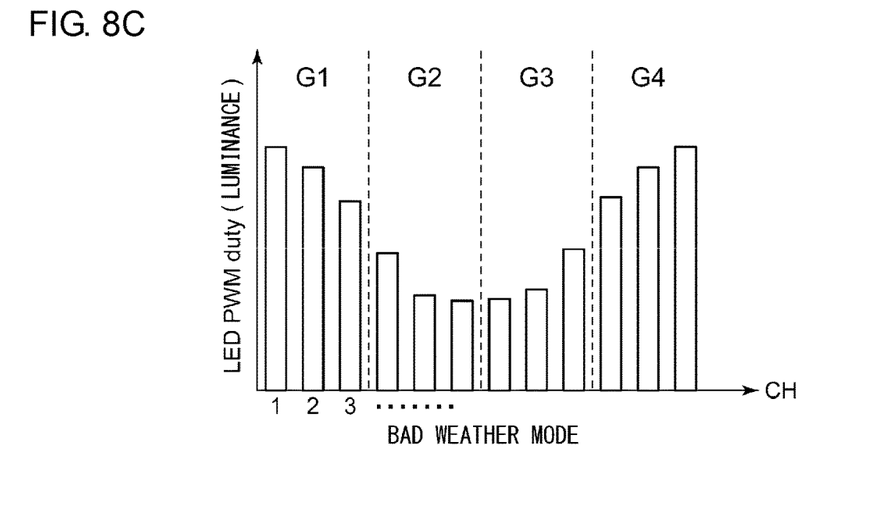

FIGS. 8A through 8C are diagrams for explaining an example of the pairing of the multiple light-emitting elements. FIG. 8A shows a normal high-beam light distribution. FIG. 8B shows a light distribution pattern to be used in the right-side swivel operation when the vehicle is traveling along a right-side curve. In the right-side swivel operation, the peak of the light distribution is shifted to the vehicle traveling direction, i.e., toward the right side. FIG. 8C shows a light distribution pattern for bad weather conditions. In a situation of rain or dense fog, in a case of emitting light toward a road surface with high light intensity, this leads to an adverse effect on visibility due to reflection. In order to solve such a problem, in such a bad weather mode, the luminance for both sides is raised while lowering the luminance for the central region. This arrangement provides improved visibility for demarcation lines, pedestrians, and oncoming vehicles.

As described above, in such a lighting device that is capable of switching and selecting one from among multiple light distribution patterns, with the maximum duty ratio (%) of the i-th ($1 \le i \le N$) light-emitting element 312 from among all the light distribution patterns as $D_{MAXi}$, each light-emitting element pair is formed such that the sum total of the maximum duty ratios of the selected two light-emitting elements is equal to or smaller than 100%.

In this example, the multiple light-emitting elements are arranged along the horizontal direction. The light-emitting elements are classified into first, second, third, and fourth groups G1 through G4, which are sequentially arranged from one end. A given light-emitting element included in the first group G1 is paired with a light-emitting element included in the third group G3. Furthermore, a given light-emitting element included in the second group G2 may be paired with a light-emitting element included in the fourth group G4. In this case, two bypass switches that correspond to the light-emitting elements thus paired may be paired.

As described above, the light-emitting elements are grouped so as to form the pairs of the light-emitting elements. This allows the same light-emitting element pairs thus paired to be applied to all the light distribution patterns shown in FIGS. 8A through 8C.

Figure 9A:
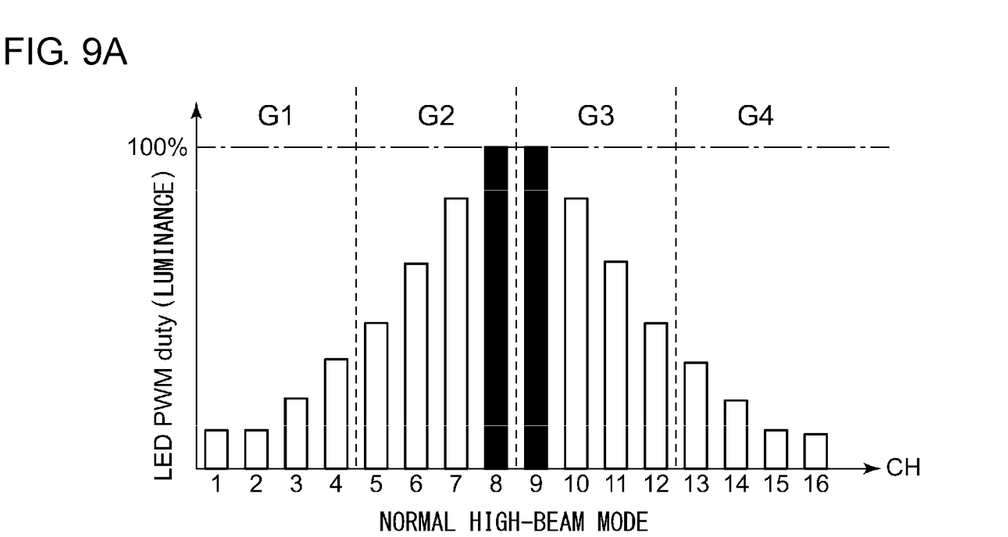
FIGS. 9A and 9B are diagrams for explaining an example of pairing of the multiple light-emitting elements.
Figure 9B:
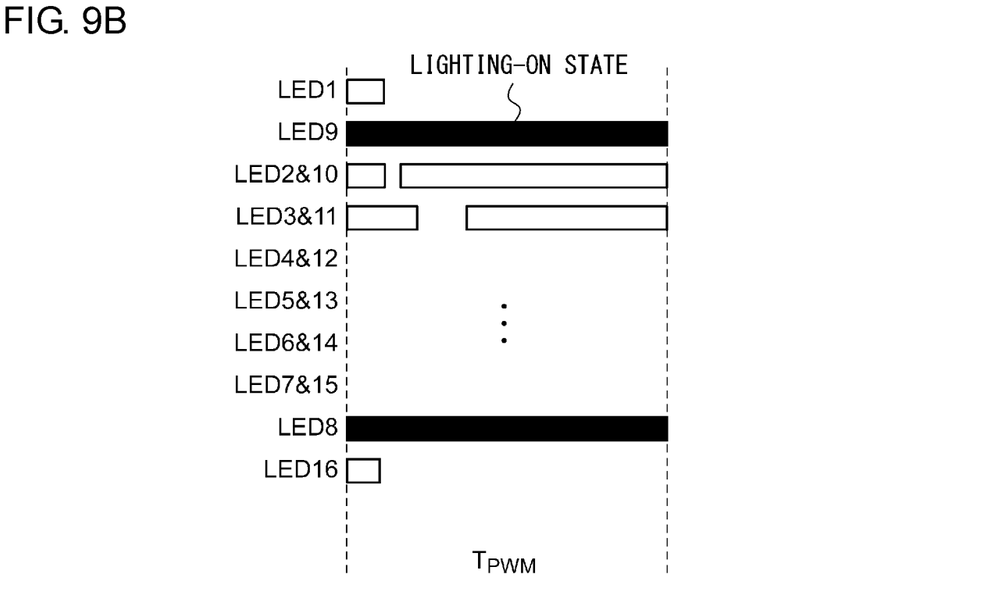

FIGS. 9A and 9B are diagrams for explaining an example of pairing of the multiple light-emitting elements. In this example, the light-emitting elements that support N=16 channels are arranged in the form of an array extending in the horizontal direction. The light-emitting elements are classified into four groups G1 through G4 such that each group includes four light-emitting elements. In this example, the light-emitting elements assigned to the eighth channel and the ninth channel are to be operated with a duty ratio of 100%. Accordingly, each of such light-emitting elements is not paired with any one of the other light-emitting elements. That is to say, these light-emitting elements are each controlled independently. In this example, the control pairs are formed as follows.

CH2+CH10
CH3+CH11
CH4+CH12
CH5+CH13
CH6+CH14
CH7+CH15

The remaining channels, i.e., CH1, CH8, CH9, and CH16, are controlled independently. Accordingly, the number of the control units thus formed is 10. FIG. 9B shows the lighting state in the PWM period.

In a case in which all the channels are controlled independently as with conventional techniques, the maximum value $V_{OUT(MAX)}$ of the output voltage $V_{OUT}$ is 16×4=64 V. Accordingly, a 60-V breakdown voltage is insufficient. In contrast, with the control operation shown in FIGS. 9A and 9B, the maximum value $V_{OUT(MAX)}$ of the output voltage $V_{OUT}$ is 10×4=40 V.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

First Modification

Figure 10:
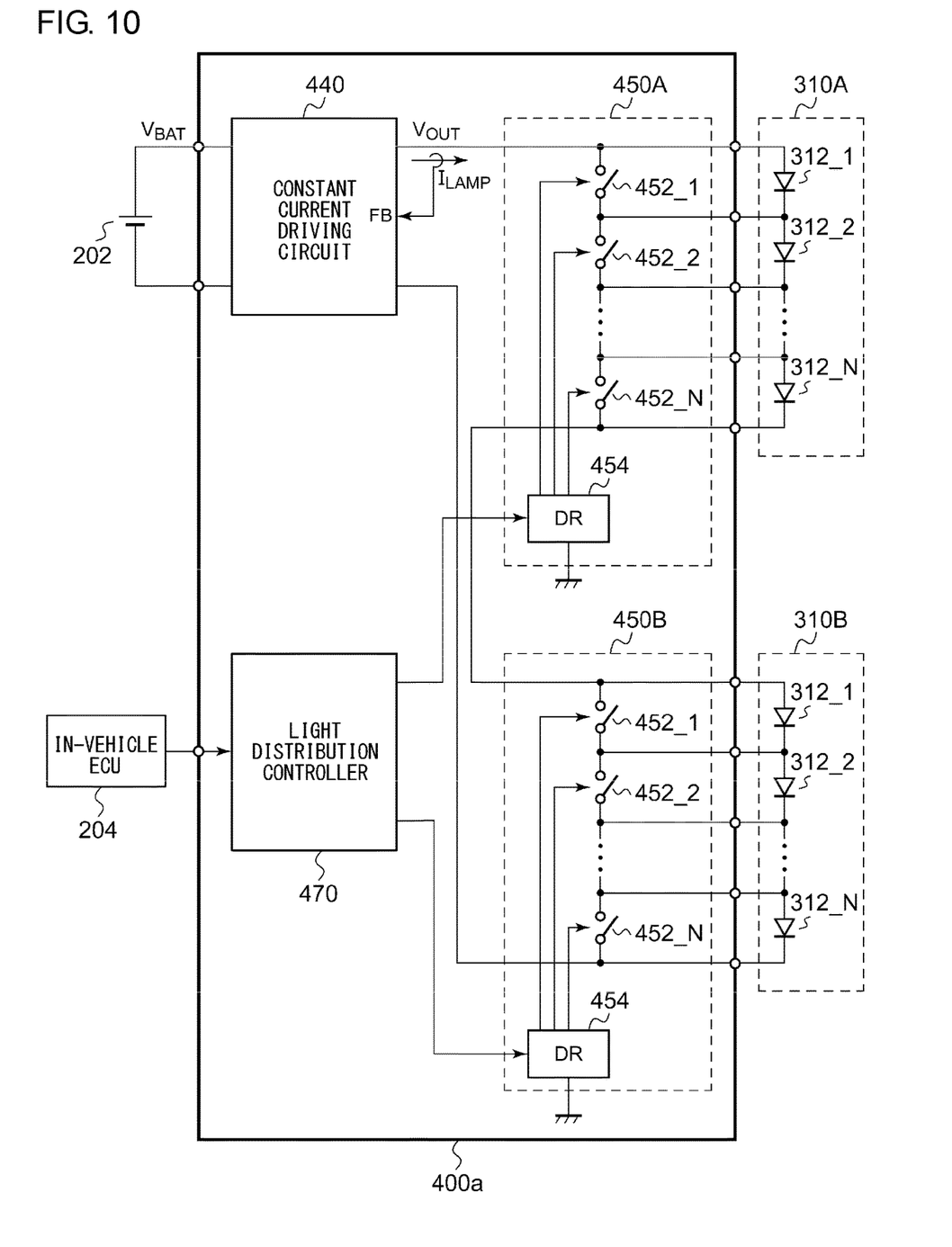
FIG. 10 is a block diagram showing a lighting circuit according to a first modification.

FIG. 10 is a block diagram showing a lighting circuit 400*a* according to a first modification. In this modification, the bypass switch circuit 450 is configured as multiple (two) separate ICs. For example, in a case in which N=24 channels, the lighting circuit 400*a* is provided with two light sources 310 each including twelve light-emitting elements 312. The bypass switch circuit 450 is provided for each of the light sources 310. The light distribution controller 470 supplies a control signal CNT for each of the bypass switch circuits 450A and 450B. With this arrangement, each bypass switch circuit 450 may be configured as a low-breakdown-voltage IC that supports a breakdown voltage that is lower than (N×$V_F$). Furthermore, this arrangement allows the range of variation of the output voltage $V_{OUT}$ of the constant current driving circuit 440 to be reduced. This arrangement allows constraints on the circuit design to be relaxed.

Second Modification

In a case in which the light distribution pattern can be switched and selected from among multiple light distribution patterns, each pair of two bypass switches may be recombined for each light distribution pattern.

Third Modification

The constant current driving circuit 440 may be configured as a constant-current-control step-up/step-down converter. Also, the constant current driving circuit 440 may be configured as a combination of a step-up, step-down, or otherwise step-up/step-down switching converter and a constant current circuit.

Fourth Modification

Various modifications may be made for forming a control unit. For example, three or four light-emitting elements each of which is to be operated with a small duty ratio may be formed as a single control unit.

While the preferred embodiments of the present invention have been described using specific terms, such description is for illustrative purposes only, and it is to be understood that changes and variations may be made without departing from the spirit or scope of the appended claims.

The invention claimed is:

1. An automotive lamp comprising:
   a light source comprising a plurality of N (N represents an integer of 2 or more) light-emitting elements electrically coupled in series and spatially arranged in a horizontal direction; and
   a lighting circuit structured to drive the light source,
   wherein the lighting circuit comprises:
      a bypass switch circuit comprising a plurality of N bypass switches each of which is coupled in parallel to a corresponding one of the plurality of N light-emitting elements;
      a constant current driving circuit structured to supply a driving current stabilized to a target current to the light source; and
      a light distribution controller structured to control the bypass switch circuit,
   wherein, when a duty ratio is determined for each of the plurality of N light-emitting elements for a given light distribution pattern, two light-emitting elements form a control unit such that a sum total of the duty ratios thereof is equal to or otherwise smaller than 100%,
   and wherein the light distribution controller is structured to switch on and off the plurality of N bypass switches such that the two light-emitting elements included in the same control unit do not turn on at the same time,
   wherein the plurality of N light-emitting elements are arranged in a horizontal direction, and are classified into a first group, a second group, a third group, and a fourth group, such that they are sequentially arranged from a given end,
   wherein one light-emitting element included in the first group is paired with one light-emitting element included in the third group,
   wherein one light-emitting element included in the second group is paired with one light-emitting element included in the fourth group,
   and wherein two bypass switches that correspond to each pair of the light-emitting elements form a pair.

2. The automotive lamp according to claim 1, wherein the light distribution pattern can be switched and selected from among a plurality of light distribution patterns,
   and wherein, with the maximum duty ratio (%) of the i-th (1≤i≤N) light-emitting element for all the light distribution patterns as $D_{MAXi}$, two or more light-emitting elements form a control unit such that the sum total of the maximum duty ratios thereof is equal to or smaller than 100%.

3. An automotive lamp comprising:
   a light source comprising a plurality of N (N represents an integer of 2 or more) light-emitting elements electrically coupled in series and spatially arranged in a horizontal direction; and
   a lighting circuit structured to drive the light source,
   wherein the lighting circuit comprises:
      a bypass switch circuit comprising a plurality of N bypass switches each of which is coupled in parallel to a corresponding one of the plurality of N light-emitting elements;
      a constant current driving circuit structured to supply a driving current stabilized to a target current to the light source; and
      a light distribution controller structured to control the bypass switch circuit,
   wherein, when a duty ratio is determined for each of the plurality of N light-emitting elements for a given light distribution pattern, two light-emitting elements form a control unit such that a sum total of the duty ratios thereof is equal to or otherwise smaller than 100%,
   and wherein the light distribution controller is structured to switch on and off the plurality of N bypass switches such that the two light-emitting elements included in the same control unit do not turn on at the same time,
   wherein the plurality of N light-emitting elements are arranged in the form of a pair of an upper array and a lower array each extending in a horizontal direction,
   wherein two or more light-emitting elements positioned in a central region of the lower array are classified as a first group,
   wherein two or more light-emitting elements positioned on both sides of the lower array are classified as a second group,
   wherein two or more light-emitting elements positioned in the upper array are classified as a third group,
   wherein one light-emitting element included in the first group is paired with one light-emitting element included in the third group, wherein one light-emitting element included in the second group is paired with one light-emitting element included in the second group, and wherein two bypass switches that correspond to the pair of the light-emitting elements form a pair.

4. An automotive lamp comprising:

a light source comprising a plurality of N (N represents an integer of 2 or more) light-emitting elements electrically coupled in series and spatially arranged in a horizontal direction; and a lighting circuit structured to drive the light source, wherein the lighting circuit comprises:

a bypass switch circuit comprising a plurality of N bypass switches each of which is coupled in parallel to a corresponding one of the plurality of N light-emitting elements;

a constant current driving circuit structured to supply a driving current stabilized to a target current to the light source; and a light distribution controller structured to control the bypass switch circuit, wherein, when a duty ratio is determined for each of the plurality of N light-emitting elements for a given light distribution pattern, two light-emitting elements form a control unit such that a sum total of the duty ratios thereof is equal to or otherwise smaller than 100%, and wherein the light distribution controller is structured to switch on and off the plurality of N bypass switches such that the two light-emitting elements included in the same control unit do not turn on at the same time, wherein the bypass switch circuit is structured as an integrated circuit, and wherein, with a forward voltage of each of the light-emitting elements as $V_F$, and with a number of the plurality of light-emitting elements as N, the bypass switch circuit has a breakdown voltage that is lower than $(V_F \times N)$.

5. An automotive lamp comprising:

a light source comprising a plurality of N (N represents an integer of 2 or more) light-emitting elements electrically coupled in series and spatially arranged in a horizontal direction; and a lighting circuit structured to drive the light source, wherein the lighting circuit comprises:

a bypass switch circuit comprising a plurality of N bypass switches each of which is coupled in parallel to a corresponding one of the plurality of N light-emitting elements;

a constant current driving circuit structured to supply a driving current stabilized to a target current to the light source; and a light distribution controller structured to control the bypass switch circuit, wherein, when a duty ratio is determined for each of the plurality of N light-emitting elements for a given light distribution pattern, two light-emitting elements form a control unit such that a sum total of the duty ratios thereof is equal to or otherwise smaller than 100%, and wherein the light distribution controller is structured to switch on and off the plurality of N bypass switches such that the two light-emitting elements included in the same control unit do not turn on at the same time, wherein the light distribution pattern can be switched and selected from among a plurality of light distribution patterns, and wherein two or more light-emitting elements that form each of the control units are recombined for each light distribution pattern.

6. A driving method for driving a light source included in an automotive lamp, comprising:

providing the light source comprising a plurality of N (N represents an integer of 2 or more) light-emitting elements electrically coupled in series, and spatially arranged in a horizontal direction;

providing a bypass switch circuit comprising a plurality of N bypass switches each of which is coupled in parallel to a corresponding one from among the plurality of light-emitting elements;

supplying a driving current stabilized to a target current to the light source;

determining a duty ratio of each of the plurality of N light-emitting elements for a given light distribution pattern, and forming two light-emitting elements as a control unit such that a sum total of the duty ratios thereof is equal to or smaller than 100%; and switching on and off the bypass switch circuit such that two bypass switches that correspond to two light-emitting elements included in the same control unit are not turned off at the same time, wherein the light distribution pattern can be switched and selected from among a plurality of light distribution patterns, and wherein two or more light-emitting elements that form each of the control units are recombined for each light distribution pattern.

* * * * *